Jan. 6, 1953   J. B. BROWN   2,624,361
VALVE FOR CONTROLLING FLUID TO A PLURALITY OF DEVICES
Filed March 30, 1946
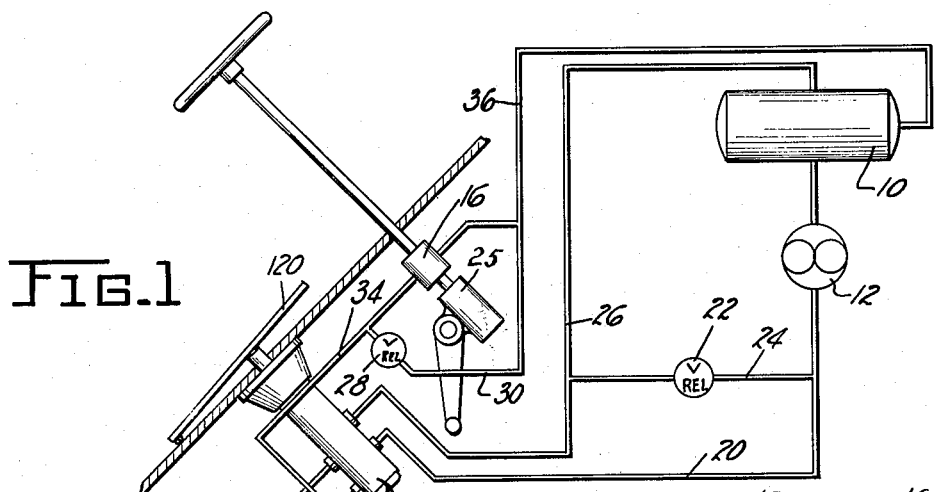
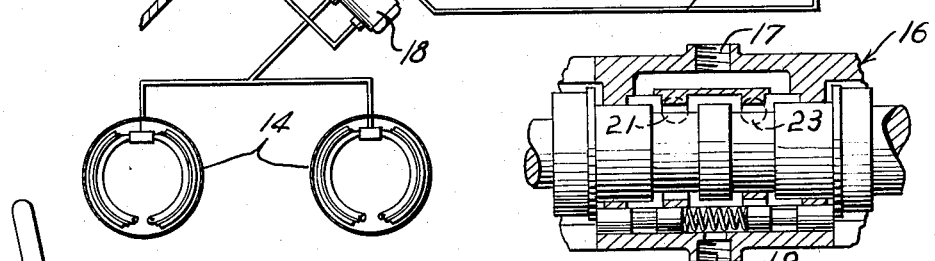
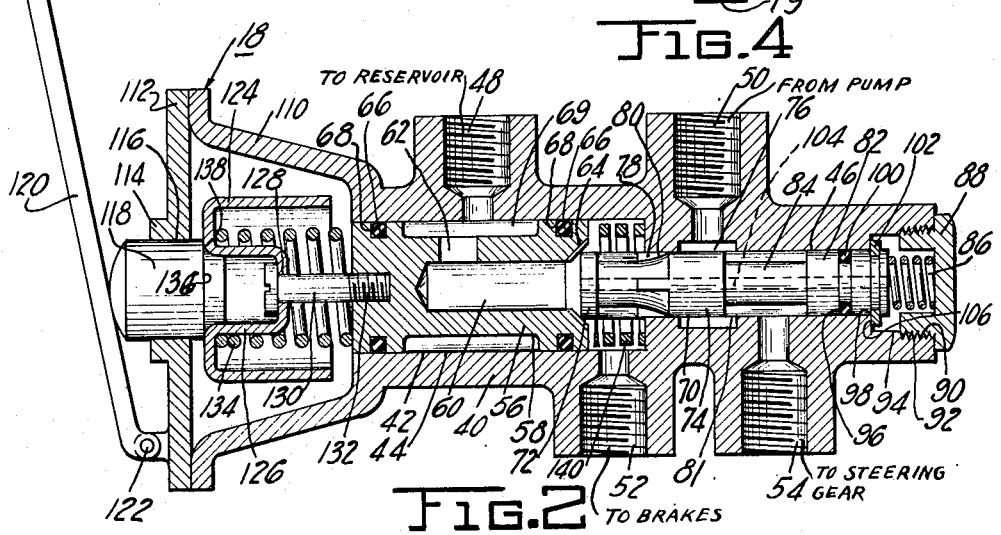
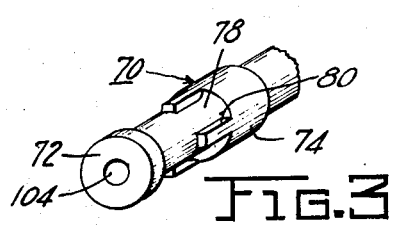
INVENTOR.
JESSE B. BROWN
BY Cecil F Arens
ATTORNEY Patented Jan. 6, 1953

2,624,361

UNITED STATES PATENT OFFICE 2,624,361

VALVE FOR CONTROLLING FLUID TO A PLURALITY OF DEVICES

Jesse B. Brown, South Bend, Ind., assignor to Bendix Aviation Corporation, South Bend, Ind., a corporation of Delaware Application March 30, 1946, Serial No. 658,370

10 Claims. (Cl. 137—102)

This invention relates generally to valves, and more particularly to that type of valve adapted for use in a hydraulic system on a vehicle where the fluid which flows from a single pump must be utilized to operate a plurality of instruments, such as steering gear and brakes, for example.

It is therefore an object of the invention to provide a manually operated valve which controls the flow of fluid from a pump to steering gear and brakes.

It is a further object of the invention to provide a valve operable to proportion the flow of fluid from a single pump, between the steering gear and brakes of a vehicle.

A still further object of the invention resides in the provision of a valve in a hydraulic system to normally connect one of the devices in the system to system flow and another of the devices of the system to reservoir.

Another important object of the invention resides in the provision of a valve for a hydraulic system to normally connect the steering gear to the pump and disconnect the brakes therefrom.

A yet further important object of the invention resides in the provision of a manually operated valve which, besides performing the aforementioned functions, provides simulated "position sense" and "feel" proportional to the braking effort.

The above and other objects and features of the invention will be apparent from the following description of the device taken in connection with the accompanying diagrammatic drawings which form a part of the specification and in which:

Figure 1 is a hydraulic system incorporating the device of the invention;

Figure 2 is a sectional elevation showing the invention;

Figure 3 is a perspective of the piston valve associated with the invention, and Figure 4 is a diagrammatic illustration of the open center valve.

Referring to Figure 1 of the drawing, numeral 10 designates a fluid reservoir which supplies fluid to a pump 12 which puts the fluid under pressure to actuate brakes 14 and furnish fluid to a steering gear valve 16 to aid in steering a vehicle, not shown. All of the steering gear connections to the fluid system are not shown since they form no part of the present invention. The brakes 14 and the steering gear valve 16 are connected to the reservoir 10 and pump 12 through a manually operated valve 18. To prevent the pressure on the fluid in line 20, which connects the pump 12 to valve 18, from rising above a predetermined value, a relief valve 22 is connected in line 24 which connects the line 20 to a line 26. Line 26 connects the valve 18 to the reservoir. To protect the steering gear valve 16 from abnormally high pressures, a relief valve 28 is disposed in a line 30 which is arranged in the system to shunt the steering valve. Line 30, into which the relief valve 28 is inserted, is connected to lines 34 and 36. Lines 34 and 36, respectively, connect the steering gear valve 16 to a manually operated valve 18 and to the reservoir 10.

Valve 16 is of conventional open center type construction and permits the free flow of fluid therethrough at times when steering is not required. The valve is shown in a neutral position. A reservoir port 17 is connected to the reservoir 10 through the conduit 36. An inlet port 19 is connected to one end of the conduit 34 the other end of which is connected to the valve 18. Ports 21 and 23 communicate with the steering gear motor 25 through passages, not shown.

Valve 18 comprises a body 40 having a bore 42 therein. The bore 42 has a large diameter 44 and a small diameter 46. A reservoir port 48, pumping port 50, and working ports 52 and 54 are disposed within the body 40. The ports 48, 50, 52 and 54 open into the bore 42 and are axially spaced apart with respect to the bore. The working ports 52 and 54 are connected respectively to the brakes 14 and steering gear 16. A valve member 56 is axially slidable in the large diameter bore 44 to control the flow of fluid between port 52 and the reservoir port 48. The valve member 56 has a reduced circumferential portion 58 which registers with the reservoir port 48 at all times during axial movement of the member in the bore. The member 56 is drilled longitudinally at 60 and laterally at 62. One end of member 56 is counter sunk at 64 concentrically with the drilled portion 60 to provide a valve seat for a purpose to be hereinafter described. Seals 66 are disposed in grooves 68 of the valve member 56 to seal space 69 between the valve member and the bore, formed by the reduced portion of the valve member, from atmosphere on one end and pump pressure on the other end.

In order to divert some or all of the fluid normally flowing from the pump to the steering gear, to the brakes, a second member or piston valve 70 is provided. The piston valve controls the flow of fluid between the pumping port and the two working ports. The piston valve 70 is slidably located in the small diameter 46 of the bore 42 and is provided with a valve head 72 formed thereon to engage the valve seat 64 of the valve member 56 to control the flow of fluid to the reservoir. Diversion of fluid between the steering gear 16 and the brake 14 is accomplished by a land 74, integral with the piston 70 and constituted to cooperate with a recess 76 in the small diameter portion 46 of bore 42. The port 50 terminates in recess 76. The land 74 is slotted at 78 to allow the passage of fluid from the pumping port 50 to port 52 which is connected to the brakes. The slots 78 have inclined faces 80 to permit graduated control over the initial flow of fluid to the brakes. The distance from the right end of land 74 to the right end of the slots 78 is slightly less than the width of recess 76 so that port 50 cannot at any time be entirely closed against pump pressure. The flow of fluid to the steering gear is controlled by a variable opening 81 which is formed between the right end of land 74 and the small diameter portion 46 of the bore 42. A second land 82 integral with the piston valve 70, is axially spaced from the land 74. A reduced portion 84, between the lands 74 and 82, provides communication between ports 50 and 54 when the piston is urged to the position shown in Figure 2 by a spring 86. With the piston valve in this position, communication between ports 50 and 52 is cut off. One end of the spring 86 engages one end of the piston valve 70 and the other end of the spring is carried by a plug 88 which is threaded at 90 to cooperate with the threaded portion 92 of a counterbore 94 formed in the end of bore 42. The land 82 is grooved at 96 and 98 to receive respectively a seal 100, and retainer washer 102. The seal 100 seals the right end of the piston from atmosphere. The retainer washer 102 engages shoulder 106 formed by the junction of the small diameter portion 46 of the bore 42 and the counterbore 94 to limit movement of the piston valve 70 to the left. The piston valve is drilled longitudinally at 104 to prevent trapping fluid in the counterbore 94 and to equalize pressure across the ends thereof. The ends of the piston valve are always subjected to the same pressure.

One end of the valve body 40 has integral therewith a housing 110, provided with a cover 112, having a boss 114 formed with an opening 116 to receive a slidable element 118, against which rides a treadle 120 fulcrumed to the cover at 122, as shown in Figure 2, or pivoted on the floor board as illustrated in Figure 1. Contained within the housing 110 is a cup-shaped element or treadle stop 124, having an inverted cup 126 formed centrally within the cup-shaped element 124. The inverted cup 126 is drilled at 128 to receive a stud 130 which has a threaded portion 132 to engage the valve member 56. A spring 134 has one end carried by the cup-shaped element and its other end abutting valve member 56. This spring compensates for movement of the member 56 to the left in response to the fluid pressure in port 52 acting on the right end of the member. That is, movement of member 56 to the left compresses spring 134. Simulated "position sense" of the treadle 120 and member 56 is hereby obtained. The stud 130 is threaded into the valve member to precompress the spring to the force required to overcome the initial friction of the ports and the force of the spring 86. The strength of spring 134 must be sufficient to withstand the maximum reaction of the pressure acting on the right end of the valve member. The effective area of the valve member on which reaction takes place when seated on the head 72, is defined by the difference in diameters of the valve member 56 and the valve head 72.

The spring 134 compensates for movement of the valve member due to reactionary force and permits a wide range of treadle travel. The slidable element 118 is provided with a shoulder 136 which engages the cup-shaped element 124 at 138. The valve member 56, cup-shaped element 124, stud 130, and spring 134 comprise an assembly which is restricted in its axial movement to the right by the cup-shaped element 124 which engages the left end of the body 40. The arrangement of the assembly is such that there will be relative movement between the valve member 56 and the cup-shaped element 124 at times, depending upon the pressure acting on the right end of the valve member 56 resisting movement thereof to the right. The spring 134 provides an adjustable resilient drive between the valve member 56 and the treadle 120. This action will be more fully explained later.

A buffer spring 140 is located in bore 42 adjacent the right end of the valve mmeber 56. In the position shown in Figure 2, the buffer spring 140 does not engage the valve member. That is, the buffer spring 140 is freely shiftable in the space between the right end of the valve member and a shoulder, formed at the junction of the large and small diameters of the bore 42.

When the valve member 56 is mounted angularly as shown in Figure 1, it is normally urged to the right due to the weight of the valve member, spring 134, element 124, and treadle 120. This will cause the valve seat 64 to engage the valve head 72 to normally cut off communication between the brakes and reservoir. Spring 86 is of sufficient strength to hold the piston valve 70 against movement to the right due to the weight of the valve member, etc., acting on the valve head 72. With the valve member in the position aforementioned, that is, where the valve seat 64 has just engaged the valve head 72, valve member 56 must be moved further to the right a predetermined distance until the slots 78 register with the recess 76, before the buffer spring engages the valve member to tend to restrict its continued movement. That is, the initial movement of piston valve 70, in response to a force applied to treadle 120, is against the comparatively light spring 86, but continued movement of the member engages the buffer spring 140 which offers a substantial resistance to the movement of the valve member. The initial movement of the piston valve registers the restricted ends of the slots with the port 50 and permits a small amount of fluid to pass through the slots to actuate the brakes evenly and gradually.

Operation of the valve of the invention is as follows:

With the valve parts in the position shown in Figure 2, and the pump 12 in operation, fluid from the pump flows through port 50, recess 76, variable opening 81, port 54 and thence to the steering gear 16. This is the path of the fluid during steering operation and when braking of the vehicle is unnecessary. Because the steering valve 16 is of the open center type there is no substantial pressure on the fluid flowing in this path when steering is not taking place. When steering is taking place the fluid in this path will be under a pressure equal to relief pressure setting of valve 28.

To apply the brakes, treadle 120 is depressed which slides piston valve 70 to the right to thereby register the ends of the slots 78, having the inclined faces, with recess 76 to pass a small amount of fluid to the brakes to initiate brake action. This initial movement of the valve member and piston valve is against the comparatively light spring 86. However, after the valve member and piston valve have been moved a predetermined distance so that the slots in the piston valve have begun to open into the recess, the valve member engages the buffer spring 140 which offers a substantially greater resistance to the continued movement of the member. It will be remembered that when this action is taking place, valve head 72 is seated on seat 64 to cut off communication between the port 52, the brakes and reservoir.

During steering the fluid in the system between the pump and the steering valve is put under pressure. That is, movement of the spool valve member of Figure 4 in either direction from neutral builds up a back pressure in line 34 and recess 76. Therefore, if a brake application is made at this time there will be immediately available for initial braking, fluid under pressure to operate the brakes. Continued movement of piston valve 70 to the right makes higher pressure available. However, as aforementioned, when steering is not taking place there is only enough pressure on the fluid to overcome the resistance of the system offered to the flow of fluid. Hence in making a brake application when steering is not taking place movement of the piston 70 must be to the right far enough to create a substantial restriction to the flow past the variable opening 81 to quickly build up a pressure in port 59 for initial brake actuation.

The fluid pressure admitted through the slots 78 and acting in port 52 and on the brakes 14 also acts on the right end of the valve member 56 tending to move it to the left against the force applied to the treadle. This fluid under pressure which is acting on the right end of member 56, as aforementioned, is commonly known as the reactionary force and increases as the piston valve is moved to the right since this causes greater area of the slots to register with the recess 76 to admit more fluid from the pump.

As the reactionary force on the end of the member increases, the force required to keep the valve seat 64 in engagement with the valve head 72 also increases. Obviously, since the force applied to the treadle is transmitted to the valve member through spring 134, this spring may be preselected so that it gives the desired deflection for a given reactionary force. This arrangement also produces "feel" so that an operator will know the extent of the braking application being made. That is, the applied force on the treadle is a measure of the pressure of the fluid in port 52 which is acting on the brakes 14. When the applied force is removed from the treadle, the reactionary force acting on the valve member moves it to the left to unseat the valve head 72 from the valve seat 64 to connect the brakes to the reservoir. The piston valve now moves under the influence of the spring 86 to the left to its normal relative position in the bore.

Although this invention has been described in connection with certain specific embodiments, the principles are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A valve for controlling the flow of fluid under pressure comprising a body, a bore in the body, reservoir, pumping, and two working ports in the body axially spaced apart with respect to the bore and opening thereinto, a piston valve disposed in the bore and constructed and arranged to control communication between the pumping and working ports, a spring biasing said piston valve to a position to establish communication between the pumping port and one of the working ports and to cut off communication between the pumping port and the other of the working ports, a manually operated valve member disposed in the bore and constructed and arranged to engage the piston valve to control its position in the bore and to thereby control communication between said other working port and the reservoir port, a valve head carried by the piston valve, said valve member having a valve seat on which the valve head normally seats to cut off communication between said other working port and the reservoir port, said valve member being responsive to a predetermined pressure in said other working port acting on one end of the valve member tending to unseat the valve head therefrom to connect said other working port to reservoir port, the predetermined pressure required to unseat the valve head being variable and dependent upon the force manually applied to the valve member, and means carried by the valve member to compensate for movement thereof in response to pressure acting on said one end, whereby simulated "position sense" is obtained.

2. A valve for controlling the flow of fluid under pressure comprising a body, a bore in the body, reservoir, pumping, and two working ports in the body axially spaced apart with respect to the bore and opening thereinto, a piston valve disposed in the bore and constructed and arranged to control communication between the pumping and working ports, a spring biasing said piston valve to a position to establish communication between the pumping port and one of the working ports and to cut off communication between the pumping port and the other of the working ports, a manually operated valve member disposed in the bore and constructed and arranged to engage the piston valve to control its position in the bore and to thereby control communication between said other working port and the reservoir port, and a valve head carried by the piston valve, said manually operated valve member having a valve seat on which the valve head normally seats to cut off communication between said other working port and the reservoir port, said valve member being responsive to a predetermined pressure in said other working port acting on one end of the valve member to unseat the valve head to connect the other working port to the reservoir port, the predetermined pressure required to unseat the valve head being variable and dependent upon the manually applied force to the valve member.

3. A valve for controlling the flow of fluid under pressure comprising a body, a bore in the body, reservoir, pumping, and two working ports in the body, each port having an opening into the bore, a piston valve slidable in the bore and constructed and arranged to normally establish communication between the pumping port and one of the working ports and to cut off communication between the pumping port and the other of the two working ports, said piston valve being slidable to a position in the bore to cut off communication between the pumping port and said one of the two working ports and establish communication between said pumping port and the other of the two working ports, and a valve member slidable in the bore and constructed and arranged to normally engage the piston valve to cut off communication between the reservoir port and said other of the two working ports and responsive to predetermined fluid pressure in said other of the two working ports to disengage said valve member from the piston valve to release said fluid pressure to the reservoir port, said valve member being so constituted that sliding the same in the bore slides the piston valve to a position to establish communication between the pumping port and said other of the two working ports.

4. A valve for controlling the flow of fluid comprising a body, a bore in the body, reservoir, pumping, and two working ports in the body, said ports constructed and arranged to have openings into the bore, means to control the flow of fluid between the pumping port and the two working ports including means slidable in the bore, a mechanism urging said slidable means to a first position in the bore to establish communication between the pumping port and one of the two working ports and to cut off communication between the pumping port and the other of the two working ports, said slidable means being slidable to a position in the bore to establish communication between the pumping port and said other of the two working ports, and means shiftable to slide the slidable means, arranged in the bore to cooperate with the slidable means to normally cut off communication between the reservoir port and said other of the two working ports said shiftable means movable in response to pressure in said other of the two working ports to thereby connect the reservoir port to said other of the two working ports, and means disposed in the path of movement of the shiftable means to be engaged thereby only after a slight initial movement of the shiftable means has urged the slidable means toward said second position in the bore to connect said other of the two working ports to the pumping port, whereby the force required to further slide the slidable means is substantially increased over the force required for its initial movement, and means carried by the shiftable means to provide simulated "position sense."

5. A valve for controlling the flow of fluid comprising a body, a bore in the body, reservoir, pumping, and two working ports in the body, said ports constructed and arranged to have openings into the bore, means to control the flow of fluid between the pumping port and the two working ports including means slidable in the bore, a mechanism urging said slidable means to a first position in the bore to establish communication between the pumping port and one of the two working ports and to cut off communication between the pumping port and the other of the two working ports, said slidable means slidable to a second position in the bore to establish communication between the pumping port and said other of the two working ports, and means shiftable to slide the slidable means, arranged in the bore to cooperate with the slidable means to normally cut off communication between the reservoir port and said other of the two working ports, said shiftable means movable in response to pressure in said other of the two working ports to thereby connect the reservoir port to said other of the two working ports, and means disposed in the path of movement of the shiftable means to be engaged thereby only after a slight initial movement of the shiftable means has urged the slidable means toward said second position, whereby the force required to further slide the slidable means is substantially increased over the force required for its initial movement.

6. A valve for controlling the flow of fluid comprising a body, a bore in the body, reservoir, pumping, and two working ports in the body, said ports constructed and arranged to have openings into the bore, means to control the flow of fluid between the pumping port and the two working ports including means slidable in the bore, a mechanism urging said slidable means to a position in the bore to establish communication between the pumping port and one of the two working ports and to cut off communication between the pumping port and the other of the two working ports, said slidable means slidable to a second position in the bore to establish communication between the pumping port and said other of the two working ports, and means shiftable to slide the slidable means, arranged in the bore to cooperate with the slidable means to normally cut off communication between the reservoir port and said other of the two working ports, said shiftable means movable in response to pressure in said other of the two working ports to thereby connect the reservoir port to said other of the two working ports.

7. A valve for controlling the flow of fluid comprising a body, a bore in the body, reservoir, pumping, and two working ports axially spaced apart with respect to the bore and opening thereinto, means in the bore to control the flow of fluid between the pumping port and the two working ports, said means including means slidable in the bore and normally positioned to establish communication between the pumping port and one of the two working ports and to cut off communication between the pumping port and the other of the two working ports, means slidable in the bore to control the flow of fluid between said other of the two working ports and the reservoir port, said second mentioned slidable means movable to a first position in the bore to normally cut off communication between said other of the two working ports and the reservoir port and responsive to fluid pressure in the said other of the two working ports to tend to move said second mentioned slidable means to a second position to establish communication between the reservoir port and said other of the two working ports, and manually operated means to control movement of the first and second mentioned slidable means.

8. In a valve of the class claimed in claim 7, wherein means is disposed between the manually operated means and the second mentioned slidable means to compensate for movement of said slidable means and to provide simulated position sense whereby the force applied to the manually operated means is a measure of the pressure of the fluid in said other of the two working ports.

9. A brake valve comprising a body, a pumping port, a reservoir port and two working ports in the body, a passage in the body common to all of the ports, and means in the passage to control the flow between the ports, said means normally positioned in the passage to establish flow between the pumping port and one of the working ports and to cut off flow between the pumping port and the other working port and movable to a position to restrict flow between the pumping port and said one working port and establish flow between the pumping port and said other working port, said means including means normally positioned in the passage to cut off flow between said other working port and said reservoir port and responsive to pressure acting in said other working port to move the same to a position to establish flow between the reservoir port and said other working port.

10. A valve for controlling the flow of fluid comprising a body, a bore in the body, first, second, third, and fourth ports in the body, each of said ports communicating with the bore, and means in the bore for controlling communication between the ports, a mechanism biasing said means to a first position in the bore where communication is established between the first port and the second port and cut off between the first port and the third port, said means being movable to a second position in the bore where communication between the first port and the second port is restricted and communication between said first port and the third port is established, said means including a manually positionable device for moving said means to its second position, said device normally cutting off communication between said third port and the fourth port and responsive to a variable pressure developed in said third port for moving the device in a direction to establish communication between the third and fourth ports.

JESSE B. BROWN.

REFERENCES CITED

The following references are of record in the file of this patent:

UNITED STATES PATENTS

| Number | Name | Date |
|---|---|---|
| 2,367,194 | Boldt | Jan. 16, 1945 |
| 2,472,694 | Chouings | June 7, 1949 |